United States Patent
Becke et al.

(10) Patent No.: US 9,671,104 B2
(45) Date of Patent: Jun. 6, 2017

(54) REFRIGERATION APPLIANCE WITH INDIRECT COOLING-CHAMBER ILLUMINATION

(71) Applicant: BSH BOSCH UND SIEMENS HAUSGERATE GMBH, Munich (DE)

(72) Inventors: Christoph Becke, Grosskarolinenfeld (DE); Max Eicher, Munich (DE); Swetlana Gorodezki, Munich (DE); Maike Kirschbaum, Munich (DE); Ralph Staud, Munich (DE); Thomas Tischer, Haar (DE)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 14/379,179

(22) PCT Filed: Feb. 7, 2013

(86) PCT No.: PCT/EP2013/052431
§ 371 (c)(1),
(2) Date: Aug. 15, 2014

(87) PCT Pub. No.: WO2013/120759
PCT Pub. Date: Aug. 22, 2013

(65) Prior Publication Data
US 2015/0247634 A1 Sep. 3, 2015

(30) Foreign Application Priority Data
Feb. 16, 2012 (DE) .......... 10 2012 202 322

(51) Int. Cl.
*F21V 33/00* (2006.01)
*F21V 8/00* (2006.01)
(Continued)

(52) U.S. Cl.
CPC .......... *F21V 33/0044* (2013.01); *F25D 27/00* (2013.01); *G02B 6/001* (2013.01); *F21W 2131/305* (2013.01)

(58) Field of Classification Search
CPC ..... F21V 33/0044; G02B 6/001; F25D 27/00; F21W 2131/305
See application file for complete search history.

(56) References Cited

U.S. PATENT DOCUMENTS 5,987,199 A * 11/1999 Zarian ............... B26D 3/06
362/559
2006/0042300 A1* 3/2006 Kim ................ A23B 7/04
62/348
(Continued)

FOREIGN PATENT DOCUMENTS

CN 1950656 4/2007
CN 101194136 6/2008
(Continued)

OTHER PUBLICATIONS

International Search Report for PCT/EP2013/052431, mailed Jun. 25, 2013.
(Continued)

*Primary Examiner* — Sharon Payne
(74) *Attorney, Agent, or Firm* — Nixon & Vanderhye P.C.

(57) ABSTRACT

The invention relates to a refrigeration appliance with at least one cooling chamber, which is formed by walls and at least one door, wherein the refrigeration appliance has an illuminating device with at least one light source for illuminating the cooling chamber indirectly.

21 Claims, 2 Drawing Sheets

(51) Int. Cl.
 *F25D 27/00* (2006.01)
 *F21W 131/305* (2006.01)

(56) References Cited

U.S. PATENT DOCUMENTS

| | | | | |
|---|---|---|---|---|
| 2007/0247831 | A1* | 10/2007 | Buelow | A47F 3/001 362/92 |
| 2008/0007945 | A1* | 1/2008 | Kelly | A47F 3/001 362/218 |
| 2010/0175404 | A1 | 7/2010 | Kim | |
| 2011/0277493 | A1* | 11/2011 | Becke | F25D 27/00 62/264 |
| 2012/0096892 | A1* | 4/2012 | Mitchell | F25D 23/126 62/389 |

FOREIGN PATENT DOCUMENTS

| | | | | |
|---|---|---|---|---|
| CN | 101240974 | | 8/2008 | |
| DE | 44 04 247 | | 8/1995 | |
| DE | 4404247 | A1 * | 8/1995 | ............ F21V 33/00 |
| EP | 1508760 | A2 * | 2/2005 | ............... F21V 7/00 |
| EP | 1 630 500 | | 3/2006 | |
| EP | 2 131 128 | | 12/2009 | |
| EP | 2 543 944 | | 1/2013 | |
| JP | 2000-258051 | | 9/2000 | |
| JP | 2005-344976 | | 12/2005 | |
| JP | 2005/344976 | * | 12/2005 | ............ F25D 27/00 |
| JP | 2006-162211 | | 6/2006 | |
| JP | 2006/162211 | * | 6/2006 | ............ F25D 27/00 |
| KR | 2010 0041052 | | 4/2010 | |
| WO | WO 2009/132954 | | 11/2009 | |
| WO | WO 2009/132954 | A2 * | 11/2009 | ............ F25D 27/00 |
| WO | WO 2010/147034 | | 12/2010 | |

OTHER PUBLICATIONS

Foreign-language Written Opinion of the International Searching Authority PCT/EP2013/052431, mailed Jun. 25, 2013.

* cited by examiner

REFRIGERATION APPLIANCE WITH INDIRECT COOLING-CHAMBER ILLUMINATION

This application is a National Phase of International Application No. PCT/EP2013/052431, filed on Feb. 7, 2013, which designated the U.S. and claims priority to DE Application No. 10 2012 202 322.4, filed on Feb. 16, 2012, the entire contents of each of which are hereby incorporated by reference.

The present invention relates to a refrigeration appliance with indirect cooling chamber illumination.

Cooling chambers in refrigeration appliances serve to store chilled goods to be cooled. The cooling chambers are illuminated so that a user can see the chilled goods more easily. This gives rise to the problem of lighting up different regions of the interior of a refrigeration appliance.

To this end the publication 102009028783 proposes providing a lamp for the interior space of a domestic appliance, in particular in a refrigerator, said lamp emitting light into a defined spatial angle segment. It is characterized in that the spatial orientation of the spatial angle segment can be set. This allows different regions of the domestic appliance to be lit up efficiently.

The object of the present invention is to provide a refrigeration appliance in which different regions of the cooling chamber can be lit up simultaneously and evenly.

This object is achieved by a refrigeration appliance as claimed in the independent claim 1. Further advantageous embodiments are set out in the subclaims.

According to one aspect an inventive refrigeration appliance has at least one cooling chamber, which is formed by walls and at least one door, the refrigeration appliance having an illumination facility with at least one light source, which is set up to illuminate the cooling chamber internally in an indirect manner. Indirect illumination allows particularly even, glare-free illumination of the interior of the cooling chamber. It also minimizes shadow formation due to objects that are arranged close to the light source.

This avoids the disadvantage of light sources for direct illumination of the chilled goods which can cause the user to be dazzled. The chilled goods can therefore be made optimally visible to the user even when the illumination is activated. A further advantage is the simultaneous, homogeneous light distribution in the cooling chamber. Indirect illumination also avoids shadow formation in an energy-efficient manner.

According to one embodiment a shield is provided to shield the direct inward radiation of light from the illumination facility partially in the direction of the interior of the chilled goods chamber. The shield makes it possible to prevent the direct inward radiation of light from the illumination facility in the direction of the interior of the chilled goods chamber at least in some regions. The interior space of the cooling chamber is lit up efficiently by the indirect shielded illumination and the user is not dazzled by direct eye contact with the illumination facility, in particular the particularly bright light sources. This glare-free illumination of the cooling chamber provides the user with a good view of the chilled goods stored in the cooling chamber with particularly few shadows.

According to a further embodiment the illumination facility is configured to generate corona light. Corona light here means that the direct light component is covered. This allows glare-free light to be generated.

According to one embodiment the illumination source is covered at least partially by a light edge or is arranged behind a light edge. The light edge is formed for example in the manner of a semi-light-permeable shield. This allows the light distribution in the cooling chamber from indirect illumination combined with direct illumination by means of the light edge to be set with multiple variations.

According to one embodiment at least subregions of the walls are set up to act as reflectors for the light generated by the illumination facility. To this end the walls are provided for example with a bright, highly reflective surface. The surface is preferably matt reflecting in order to avoid light reflexes and dazzling of the operator. This can improve the luminous efficiency, it allows the provision of light sources with low electrical power, thereby reducing the energy requirement of the refrigeration appliance and increasing energy efficiency.

According to a further embodiment the illumination facility is set up to illuminate individual regions, in particular the corners of the cooling chamber, in a specific manner. The corners, in other words the regions where the walls of the cooling chamber come together, are often poorly illuminated. Specific illumination of these regions allows a high light intensity to provided there, so that for example dark corner regions in the cooling chamber can be avoided.

According to one embodiment the illumination facility has at least one light-emitting diode and/or fluorescent lamp and/or halogen lamp as the light source. Light-emitting diodes have the major advantage of being particularly energy-efficient, in other words of providing a large quantity of light with low power consumption. This can on the one hand lower the energy consumption of the refrigeration appliance in respect of illumination and also reduce the heating of the cooling chamber by the light source. The second in turn allows a reduction of the required cooling power of the refrigeration appliance to be achieved. The fluorescent lamp can be provided particularly economically and allows the emission of light over a relatively large surface. This allows particularly homogeneous lighting of the cooling chamber to be achieved in a simple manner.

According to a further embodiment the illumination facility has at least one light guide connected downstream of the light source and set up to couple in light from the light source and conduct the light further. The light can be conducted further by means of the light guide and be coupled out again in order then to illuminate a defined region of the cooling chamber.

The light guide can also be provided to split so that the coupled in light can be transported by way of different branches of the light guide to different points. The light guide allows more flexible distribution of the light generated by the light source in the cooling chamber. Spatial decoupling of light source and illuminated region of the cooling chamber can also be achieved. The light guide has light coupling out regions to couple the light out of the light guide at the desired point. These are configured for example as regions of the light guide with reduced mirroring on the boundary surface of the light guide.

The light source can also be arranged outside the cooling chamber for example, the light then being conducted by means of the light guide to the points of the cooling chamber to be illuminated. This reduces the energy input into the cooling chamber to illuminate the cooling chamber. It is also possible to illuminate points of the cooling chamber directly by means of the light guide where there is not enough space for the light source. The light guide can have for example a number of light coupling out regions. This allows a number of points of the cooling chamber that are at a distance from one another to be illuminated by means of one light source.

The light guide can be made for example essentially of plastic, in particular polycarbonate or polymethyl methacrylate. This makes it flexible and able to be adapted easily to the geometry of the cooling chamber or refrigeration appliance.

The light guide has for example transparent colored light coupling out regions of different colors. This allows different regions of the cooling chamber to be illuminated in different colors. It is thus possible for example to highlight functional regions in the cooling chamber, e.g. switches, by a particular color or more intense illumination. The several light coupling out regions allow the electrical outlay for light sources and cabling to be reduced, thereby saving costs and increasing the reliability of the refrigeration appliance due to the reduced electrical system. For the same reason a number of different light sources can also be provided, emitting light in different colors and/or light intensities.

According to one embodiment the illumination facility is set up to illuminate the cooling chamber in an alternating manner with light in different colors as a function of time. As a result the light intensity can be increased slowly or quickly, for example after the door of the cooling chamber has been opened, in order to avoid dazzling the user. It is also possible to illuminate the cooling chamber based on the time of day, for example with a color spectrum more toward the blue in the morning and more toward the red in the evening.

According to a further embodiment the light guide runs in the region of an air channel for ventilating the cooling chamber, in particular on the rear wall of the cooling chamber. This allows the light guide to be positioned in a very space-saving manner. Also the light guide is protected from damage in the region of the air channel. There is therefore no need to introduce additional depressions in the walls of the refrigeration appliance to accommodate the light guide in a particularly well protected manner. The refrigeration appliance can therefore be produced more simply and economically. The air channel also allows the light guide to pass outside the cooling chamber, so that a light source arranged outside the cooling chamber can be used to illuminate the cooling chamber.

According to one embodiment a light-reflecting shield of the respective light source is arranged so that it shields light in the direction of the interior of the cooling chamber. The light from the light source or light guide striking the shield is therefore not simply absorbed but reflected into the cooling chamber. This allows luminous efficiency and therefore efficiency to be increased. It generally makes the lighting of the cooling chamber more even. It also allows a greater reduction of point reflexes in the cooling chamber due to the light source to be achieved. The shield can for example also be somewhat light-permeable, making the lighting of the cooling chamber more homogeneous and avoiding dark spots.

According to a further embodiment the light guide is provided so that it runs horizontally around the cooling chamber. This produces a particularly homogeneous light distribution in the cooling chamber.

A refrigerating circuit of the refrigeration appliance comprises for example a compressor for compressing refrigerant vapor, a condenser connected downstream of the compressor to condense the refrigerant vapor and an evaporator connected downstream of the condenser and upstream of the compressor to evaporate the condensed refrigerant. Like the evaporator, the compressor is set up to transfer heat between the supplied air and the fluid in the refrigerating circuit.

A refrigeration appliance refers in particular to a domestic refrigeration appliance, in other words a refrigeration appliance used for household management in a domestic context or in catering, serving in particular to store food and/or beverages at defined temperatures, for example a refrigerator, freezer, combined refrigerator/freezer, chest freezer or wine cooler.

Further possible implementations of the invention also comprise combinations of features described above or below in relation to exemplary embodiments that are not specifically cited. The person skilled in (he art will also add individual aspects to improve or supplement the respective basic form of the refrigeration appliance.

Further advantageous embodiments and aspects of the invention are the subject matter of the subclaims and the exemplary embodiments of the invention described below. The invention is also described in more detail based on preferred embodiments with reference to the accompanying figures, in which:

Figure 1:
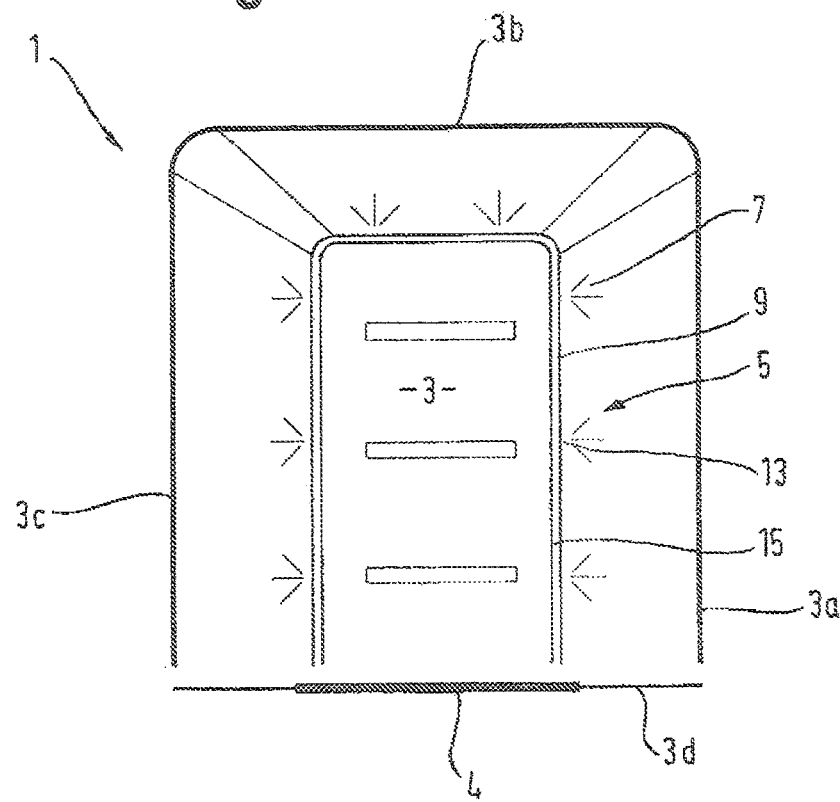
FIG. 1 shows a schematic sectional diagram of a refrigeration appliance according to a first exemplary embodiment.

FIG. 1 shows a schematic sectional view of a refrigeration appliance 1 according to a first exemplary embodiment. The refrigeration appliance 1 has a cooling chamber 3 located in its interior for accommodating chilled goods. The cooling chamber 3 is shown essentially with a rectangular cross section here. The cooling chamber 3 is formed by walls 3a, 3b, 3c, 3d and at least one door 4, which delimits the interior of the cooling chamber 3 to the outside. The door 4 is used to access the chilled goods arranged in the cooling chamber 3. The cooling chamber 3 can be cooled for example by means of a refrigerant circuit (not shown in detail here) of the refrigeration appliance.

The refrigeration appliance 1 also has an illumination facility 5 for the internal illumination of the cooling chamber 3. The interior space formed by the cooling chamber 3 can therefore by illuminated by the illumination facility 5. This allows the user to see the chilled goods stored in the cooling chamber more easily. The illumination facility 5 has at least one light source 7. The illumination facility 5 is set up to illuminate the cooling chamber 3 internally in an indirect manner. To this end the illumination facility 5 has a shield 15, which prevents the direct inward radiation of light from the illumination facility 5 in the direction of the interior of the chilled goods chamber 3 at least in some regions. In the exemplary embodiment the illumination facility 5 has a light guide 9 connected downstream of the light source. The light guide 9 is arranged in such a manner that the light generated by the light source 7 can be coupled into the light guide 9 and conducted further by this. As a result the light can be conducted from the light source 7 by the light guide 9 and coupled out again in order to illuminate a region of the cooling chamber 3 away from the light source 7. In this exemplary embodiment the light guide 9 is made of polymethyl methacrylate so that it can be easily adapted to the contour of the cooling chamber 3. To couple the light out of the light guide 9 at the desired point the light guide 9 has light coupling out regions 13. In the present exemplary embodiment these are configured as regions of the light guide 9 with reduced mirroring on the boundary surface of the light guide 9. A number of points in the cooling chamber 3 can be illuminated with one light source 7 by means of the light guide 9 with a number of light coupling out regions 13. This allows the light to be distributed efficiently and economically in the cooling chamber 3.

Figure 2:
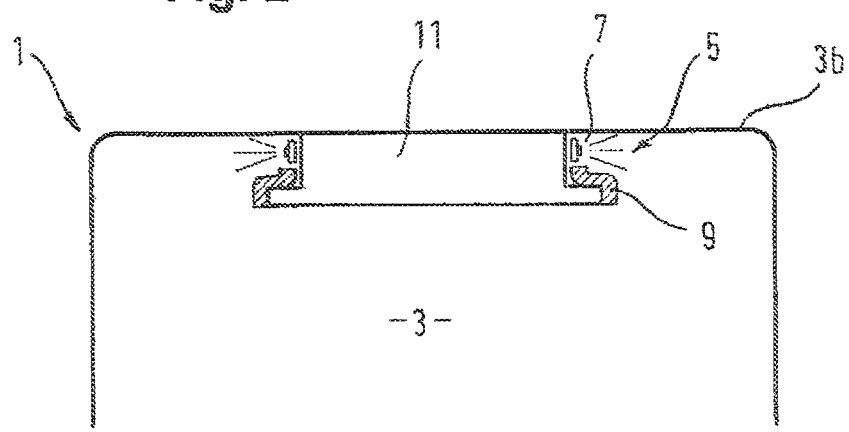
FIG. 2 shows a schematic sectional diagram as a partial view of a refrigeration appliance according to a second exemplary embodiment.

FIG. 2 shows a schematic sectional diagram as a partial view of a refrigeration appliance 1 according to a second exemplary embodiment. The structure corresponds essentially to the embodiment in FIG. 1, to which reference is made here. A wall 3b of the cooling chamber 3, in this instance the rear wall, however has an air channel 11 to ventilate the cooling chamber. The air channel 11 is shown in cross section. The light guide 9 runs in the region of the air channel 11. This allows the light guide 9 to be arranged in a very space-saving manner. Also the light guide is protected from damage in the region of the air channel 11. The air channel 11 also allows the light guide 9 to pass outside the cooling chamber 3, so that a light source 7 arranged outside the cooling chamber 3 can be used to illuminate the cooling chamber 3. The air channel 11, which runs vertically here, also allows efficient light distribution over a significant height within the cooling chamber 3.

Figure 3:
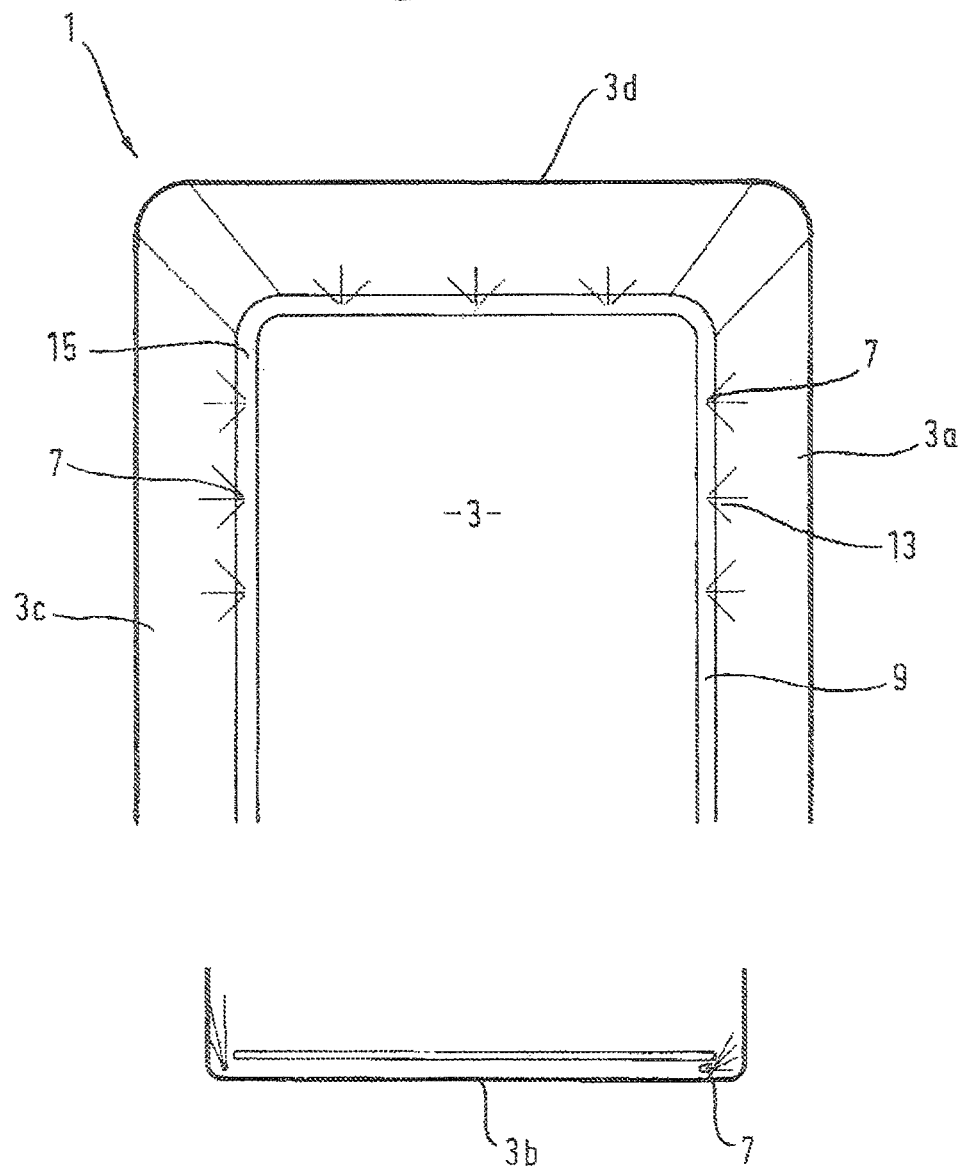
FIG. 3 shows a schematic sectional diagram of a refrigeration appliance according to a third exemplary embodiment.

FIG. 3 shows a schematic sectional diagram of a refrigeration appliance 1 according to a third exemplary embodiment. Running on the side 3a of the cooling chamber 3 shown on the right is a light guide 9, into which the light from a light source 7 is coupled. This side is therefore lit up in particular by way of the light guide 9. Light coupling out regions 13 provided on the light guide 9 allow even light distribution over a large region. Arranged on the opposing side 3c are a number of light sources 7 to light up the side 3c indirectly. Light distribution is improved by a shield 15 arranged on the side 3c, which allows indirect illumination of the interior space of the cooling chamber 3 by partially preventing direct inward radiation from the light sources 7 in the direction of the interior space of the cooling chamber 3.

REFERENCE CHARACTERS USED

1 Refrigeration appliance
3 Cooling chamber
3a, 3b, 3c, 3d Walls
4 Door
5 Illumination facility
7 Light source
9 Light guide
11 Air channel
13 Light coupling out region
15 Shield

The invention claimed is:

1. A refrigeration appliance with at least one cooling chamber, which is formed by walls and at least one door, wherein the refrigeration appliance has an illumination facility with (a) at least one light source to illuminate chilled goods within the cooling chamber indirectly (b) a shield provided to shield the chilled goods from the direct inward radiation of light from the illumination facility, and (c) a light guide with mirrored inner walls, the light guide being connected downstream of the light source and set up to couple in light from the light source and conduct the light into the cooling chamber, wherein the light guide has ends and light coupling out regions with less or no mirroring positioned between the ends to couple the light out of the light guide and into the cooling chamber, the light from the coupling out regions illuminating the chilled goods and being provided to the chamber in addition to and separately from the light from the light source that is also provided into the chamber for indirect illumination of the chilled goods, the light guide being positioned proximate a region of an air channel for ventilating the cooling chamber.

2. The refrigeration appliance as claimed in claim 1, wherein the illumination facility is configured to generate corona light.

3. The refrigeration appliance as claimed in claim 1, wherein the illumination source is covered at least partially by a light edge or is arranged behind a light edge.

4. The refrigeration appliance as claimed in claim 1, wherein at least subregions of the walls are formed in the manner of reflectors for the light generated by the illumination facility.

5. The refrigeration appliance as claimed in claim 1, wherein the illumination facility is set up to illuminate individual regions, including the corners of the cooling chamber.

6. The refrigeration appliance as claimed in claim 1, wherein the light source has at least one light-emitting diode and/or fluorescent lamp and/or halogen lamp.

7. The refrigeration appliance as claimed in claim 1, wherein the light guide runs adjacent the rear wall of the cooling chamber.

8. The refrigeration appliance as claimed in claim 1, wherein the light guide has transparent colored light coupling out regions of different colors.

9. The refrigeration appliance as claimed in claim 1, wherein the light guide is made of a plastic including polycarbonate or polymethyl methacrylate.

10. The refrigeration appliance as claimed in claim 1, wherein the light guide is arranged so that it runs horizontally around the cooling chamber.

11. The refrigeration appliance as claimed in claim 1, wherein the illumination facility is set up to illuminate different regions of the cooling chamber, in an alternating manner with light in a number of different colors.

12. The refrigeration appliance as claimed in claim 1, wherein the illumination facility has a number of light sources, which emit light in different colors and/or light intensities.

13. The refrigeration appliance as claimed in claim 1, wherein a light-reflecting shield of the respective light source is arranged so that it shields light in the direction of the interior of the cooling chamber.

14. The refrigeration appliance as claimed in claim 1, wherein the shield is positioned downstream from where the light beam enters the cooling chamber.

15. The refrigeration appliance as claimed in claim 1, wherein the light source is provided inside the cooling chamber.

16. The refrigeration appliance as claimed in claim 1, wherein light from the light source and light from the coupling out regions are provided to the cooling chamber in parallel fashion.

17. The refrigeration appliance as claimed in claim 1, wherein the light source is disposed between the ends of the light guide.

18. The refrigeration appliance as claimed in claim 1, wherein the coupling out regions are disposed on a longitudinal boundary surface of the light guide.

19. A refrigeration appliance, the refrigeration appliance comprising at least one cooling chamber formed by walls and at least one door, wherein the refrigeration appliance has an illumination facility with (a) at least one light source to generate and direct radiation of light into the cooling chamber, the light source being configured to illuminate chilled goods within the cooling chamber indirectly, the light source suspended from a top of the cooling chamber, (b) a shield provided to shield the direct inward radiation of light from the illumination facility partially in the direction of the interior of the chilled goods chamber, the shield provided to shield chilled goods from direct illumination from the light source, and (c) a light guide having mirrored inner walls, the light guide being connected downstream of the light source and set up to couple in light from the light source and conduct the light into the cooling chamber to illuminate the chilled goods within the cooling chamber indirectly, wherein the light guide has ends and light coupling out regions, the coupling out regions corresponding to portions of the mirrored inner walls of the light guide where mirroring has been reduced or removed, the coupling out regions being positioned between the ends, the coupling out regions being positioned to couple the light out of the light guide and into the cooling chamber, the light source being positioned between the ends such that light radiates from the light source in opposite directions along the light guide, the light from the coupling out regions being provided into the cooling chamber in addition to the light from the light source being introduced into the cooling chamber, the shield being positioned to shield chilled goods from direct illumination from the light passing through the coupling out regions, the light guide being positioned proximate a region of an air channel for ventilating the cooling chamber, wherein light generated from the light source is directed from inward to radially outward from the air channel.

20. The refrigeration appliance as claimed in claim 19, wherein the light guide is arranged so that it runs horizontally around the cooling chamber.

21. The refrigeration appliance as claimed in claim 19, wherein the light source is provided inside the cooling chamber.

* * * * *